United States Patent [19]

Lamand et al.

[11] 3,923,982
[45] Dec. 2, 1975

[54] PROCESS FOR PREVENTING TRACE ELEMENT DEFICIENCY IN ANIMALS AND COMPOSITIONS FOR CARRYING OUT SAID PROCESS

[75] Inventors: Michel Lamand; Claudine Lab nee Astier; Remy Roux; Paul Chagnaud, all of Beaumont, France

[73] Assignee: Establissement Public Dit: Institut National de la Recherche Agronomique, Paris, France

[22] Filed: Sept. 19, 1973

[21] Appl. No.: 398,626

[30] Foreign Application Priority Data
Sept. 20, 1972  France .............................. 72.33282

[52] U.S. Cl. ................ 424/140; 424/131; 424/144; 424/145
[51] Int. Cl.² .......................................... A61K 27/00
[58] Field of Search ............ 424/145, 140, 144, 147, 424/365

[56] References Cited
UNITED STATES PATENTS

| | | | |
|---|---|---|---|
| 2,476,351 | 7/1949 | Binkley | 424/365 |
| 2,951,014 | 8/1960 | Garman | 424/147 |
| 3,712,291 | 1/1973 | Freeman | 424/147 |

OTHER PUBLICATIONS

Martin et al., —Husa's Pharmaceutical Dispensing, (1966), p. 399.

Primary Examiner—Frederick E. Waddell
Attorney, Agent, or Firm—Burgess, Dinklage & Sprung

[57] ABSTRACT

A process for preventing trace element deficiency in animals and injectable compositions are described.

The trace element compounds are put in suspension in an oil, such as purified olive oil. The said compounds are in an insoluble, non ionizable form, which is solubilized slowly by a moderate inflammatory reaction. In the case of copper, a suitable form is powdered copper or copper oxide. For zinc, zinc oxide or zinc is used. For manganese, the oxide $Mn_3O_4$ is prefered.

The compositions are administered to ovines, or bovines by intramuscular or subcutaneous injections.

11 Claims, No Drawings

PROCESS FOR PREVENTING TRACE ELEMENT DEFICIENCY IN ANIMALS AND COMPOSITIONS FOR CARRYING OUT SAID PROCESS

The present invention relates to a process for preventing trace element deficiency in animals and compositions for carrying out said process. More particularly it relates to compositions for intramuscular or subcutaneous injection and containing trace elements, comprising copper, zinc or manganese.

It is known that products for intramuscular injection comprising trace elements, notably solutions of salts of trace elements, are very caustic and induce severe inflamation (abscesses, necroses etc) at points of injection. Efforts have already been made to overcome this drawback by lowering the concentration of the active element until the inflamation is eradicated. In this case the doses used become completely inefficacious.

It has also been suggested that trace elements be supplied by another method than by injection. Thus, providing copper per os was found to be effective. Said method of supply is also suited for treating zinc deficiency (BLACKMON D. M., MILLER W. J., MORTON J. D., 1967, Vet. Med. Small Anim. Clin. 62 (3) 265–270). However, in such a treatment, provision of trace elements must be repeated every day for at least about ten days. Said method of treatment is therefore costly from the point of view of labour and not very practical if a certain number of animals are to be treated.

Copper glycinate, complex (EDTA, Ca, Cu) or copper methioninate have already been used successfully to prevent or treat copper deficiency in ruminants. In this connection, the following articles may be referred to:

CAMARGO W. V., LEE J. J. DEWEY D. W., 1962 Proc. Aust. Soc. Anim. Prod. 4, 12.
CUNNINGHAM I. J. 1959, N. Z. Vet. J. 7, 15.
MOULE G. R., SUTHERLAND A. K., HARVEY J. M. 1959, Queensl. J. Agr. Sci. 18, 93
SUTHERLAND A. K., MOULE G. R., HARVEY J. M. 1955 Aust. Vet. J 31.
HEMINGWAY R. G., MAC PHERSON A., RITCHIE N. S., 1970. In Trace Element Metabolism in Animals. E. and S. Livingstone Publisher. Edinborough-London, p. 264
ISHMAEL J. 1970, In Trace Element Metabolism in Animals E. and S. Livingstone, publisher. Edinborough-London p. 267.
ISHMAEL J. TREEBY P. J. HOWELL J. Mc C. 1970 In Trace Element Metabolism in Animals E. and S. Livingstone, publisher, Edinborough-London p. 268.

However, said complex induce more or less severe inflammatory reactions at the point of injection (as was observed by many of the authors of the aforesaid articles). By way of illustration, in the case of subcutaneous injections of 400 mg copper glycinate into the dewlaps of Fresian or Holstein cows, the fold of the dewlap thickened from 2 cm to 10 cm in 4 days, and 19 days later said fold was still 5 cm thick on an average.

Finally, injectable solutions, notably copper complexes, are at present used. Said solutions are certainly easy to handle and efficacious but they induce severe inflamatory reactions which are painful for the animal and disquieting for the stock breeder.

The known compositions for intravenous injection, comprising copper sulphate or zinc chloride ($ZnCl_2$) for example, contain trace elements in the form of ionizable soluble salts. Considerable practical difficulties exist in administrating such compounds, which makes them costly. Moreover, they induce shock in the receiving animal owing to their being administered intravenously.

The known compounds for intramuscular injection are easier to use. They also contain salts of trace elements in the soluble and ionizable form. Their main drawback, as has been emphasized, is that they induce abscesses in the animal at the point of injection. The doses of trace elements therefore have to be decreased to prevent said inflammatory phenomena. The unitary dose injected with the certainty of its being innocuous is then completely ineffective. At present it is therefore only possible to use concentrations of trace elements in unitary doses ranging from a few micrograms to about a milligram.

It should also be emphasized that up to now all the known compositions contain salts of trace elements which are rapidly released at the injection sites.

All the characteristics of the known compositions for preventing trace element deficiency in animals, and their drawbacks, are described in the articles by M. LAMAND et al. "Investigation into the frequency and geographical distribution of trace element deficiency diseases in France" (Cah. Med. Vet. 1973, 42 155–175). Said article, which is to be considered as a reference, also illustrates the serious consequences of trace element deficiency in the animal. It must be admitted that, up to now, it has not been possible to combat such deficiency in a practical and effective manner, and extensive research is being undertaken on this problem in the important stock breeding countries.

The invention has as its object injectable compositions containing sufficient amounts of trace elements to provide good efficiency and inducing practically no secondary reactions.

A further object of the invention is compositions comprising trace elements, notably copper, zinc or manganese, presented in the form of suspensions suited to intramuscular or subcutaneous injection and inducing neither notable inflammation nor stock or pain likely to modify the behaviour of animals, the said suspensions further possessing a delay action effect whereby only one operation is necessary.

In its most general aspect, the invention therefore relates to compositions containing trace elements, injectable by intramuscular or subcutaneous routes, characterized in that they are presented in the form of suspensions containing the said trace elements in a viscous, apyrogenic excipient, and that the trace element compounds put in suspension are compounds insoluble in aqueous media, non ionizable and capable of being released slowly after intramuscular or subcutaneous injection by a moderate inflammatory process.

The invention also relates to a process for preventing trace element deficiency in animals characterized in administering to the animal to be treated, by intramuscular or subcutaneous injection, an effective amount of an injectable composition of the type described herein above.

It should be emphasized that the excipient should have a viscous consistancy and be apyrogenic. It is preferable to use an oil, advantageously previously purified, as a man of the art knows how to moster the technique of injecting oily compositions. As excipients, it is also possible to use gum arabic, polyvinylpyrrolidonne (PVP) solutions, dextran, gelatine, insofar as all said products do not induce inflammation when injected.

As the oil, a vegetable oil is preferably used, such as olive, groundnut, maize or sunflower oil or almond oil.

It is important that the oil used as suspension medium is washed and purified. A suitable treatment consists in intimately contacting the oil and an alcohol, such as ethyl alcohol, then is removing the alcohol, notably by submitting the oil to the action of a vacuum to remove the last traces of alcohol. It is also possible to neutralize the oil by preliminary treatment with a substance having an alkaline reaction to free the oil from any free acids.

The trace element compounds in suspension are the usual trace elements used to remedy metal deficiencies, and preferably copper, zinc or manganese compounds. However, according to the invention, said compounds are insoluble in aqueous media, non ionisable and capable of being released slowly after intramuscular or subcutaneous injection by a moderate inflammatory process. The compounds of trace elements are therefore present in the compositions according to the invention in the form of metals or metallic oxides and not in the form of salts or complexes. Thus, none of said compounds is caustic when injected and induces practically no detectable reaction at the site of injection.

The metal ions could only be caustic after solubilization, and therefore ionization. They are then mobilized in the lymph and blood circulation as they are produced.

According to preferred modes of embodiment of the invention, the trace element compounds are, in the case of copper and zinc, copper and copper oxide, zinc and zinc oxide and, in the case of manganese, manganese or $MnO_2$ and $Mn_3O_4$ oxides.

To ensure uniform suspension the said compounds should be used in the form of very fine powders.

Another essential difference should be noted between the form of the trace element compounds in suspension according to the invention and those of certain trace elements, essentially copper, previously used in aqueous medium, notably the colloidal form. In colloidal solutions, the material is dispersed in particles or micella of sizes approximately in the range of 0.3 to 0.003 micron, making them visible only with an ultramicroscope. In colloidal solutions micella rarely measure more than 1 micron. On the other hand, the trace elements compounds is suspension according to the invention are advantageously used in the form of powders the individual particles of which have a particle size 1 to 3 $\mu$, particularly of 1 to 2 $\mu$, but which, in aqueous solution, can clump in 5 to 30 $\mu$ micella.

Furthermore, colloidal metals are known to be non specific stimulators of the reticuloendothelial system and immune defenses. The colloidal form implies that the active amount of trace element per unit dose is small. In the case of the administration of colloidal copper to an animal, for example, the small amount of trace element supplied to the animal is mobilized for immune defense and is incapable of specifically combating feed deficiency, which requires a much larger amount. Moreover, colloidal metals only induce a transitory, non durable effect.

As an example, solutions exist containing 50 to 150 mg colloidal copper/100 ml. 10 ml administered by intramuscular injection to an adult bovine constitutes a volume it is difficult to exceed without impairing the muscle locally. Such an injection would provide an adult bovine with 5 to 15 mg copper, which is very little and would be ineffective, or only have a very short lived period of effectiveness.

In the case of colloidal copper oxide, a 0.2g p.1000 solution would enable 2 mg of oxide, or 1.6 mg of metal copper to be injected to an adult bovine. Such a dose is approximately that of the ineffective medicaments now available on the market.

According to an advantageous characteristic of the present invention, it is possible to use suspensions of trace element compounds at concentrations much stronger than those existing in an equal volume of liquid of the previously known injectable compositions. Said compositions being at least ten times and often a 100 or more times greater than those of known compositions.

In the case of copper, for example, it is possible to use concentrations of powdered copper of about 10 mg per ml to 15 mg/ml olive oil, for example, 12 or 12.5 mg/ml. These figures are given by way of illustration and it is possible to depart from them without thereby departing from the scope of the invention. In the case of zinc, 45 mg/ml to 120 mg/ml concentrations of zinc oxide ZnO powder have been found suitable, with olive oil as a suspension medium. With copper oxide CuO, concentrations of 10 to 20 mg/ml, for example of 15 mg/ml are suitable. For ovines, the unit dose injected will be notably 5 ml, and for bovines it will be 10 ml. The volume injected can be increased to the dose compatible with an absence of toxicity. It is only the amount of active product which counts.

The same remarks apply in the case of zinc. Concentrations of zinc in oil of 40 to 100 mg/ml are suitable, for example, 60 mg/ml. Unit doses of 10 ml, representing, for example, 600 mg zinc per dose, can be administered to bovines.

The invention will be illustrated while in no way being limited by the following description which relates to compositions administratable by intramuscular or subcutaneous injection presented in the form of suspensions in olive oil of trace elements (copper, zinc, manganese).

EXAMPLE 1

20 ewes weighing about 45 kg were used in each experiment. From the pre-experimental phase, and to the exclusion of all other nourishment, these animals received fodder containing 4.3 mg copper and 28 mg zinc/kg dry matter. These levels are less than the requirements which are respectively 7 and 50 mg/kg dry matter.

Heparinized blood was taken 3 times a week. Copper and zinc in the plasmas were determined by atomic absorption spectrometry after deproteinization with trichloracetic acid. Ceruloplasmine was determined by the method of SUNDERMAN F. W. and NOMOTO J. and S. (1970 Clin. Chem. 16 903–910). The results of ceruloplasmic activity are expressed in D.O. units.

1a. Injection of copper in the form of metal/copper.

After a preexperimental period of two and a half weeks, the animals were classified in order of increasing cupremia, and animals having similar levels of cupremia were paired off prior to the injection of copper. Only one ewe of each pair, selected at random, received an intramuscular injection in the neck of 50 mg colloidal copper having a particle size of one micron (Alfa inorganics inc, Beverly, Mass. United States, reference 00094).

The copper was put into suspension by stirring in 4 ml olive oil. 50 mg of powdered copper having a mean particle size of 2 $\mu$ was used. The olive oil was previously washed 5 times in 95% ethyl alcohol and subjected to a vacuum to remove the last traces of alcohol. The animals were slaughtered 21 days after the injection to remove a liver sample (Spiegal's lobule).

The results obtained are given in tables 1 to 3 below.

The average levels of cupremia prior to treatment are very heterogenous (table 1) and remained higher than 70 $\mu$ g/100 ml during the entire experiment. The same holds good for plasmic ceruloplasmine (table 2). For this reason, it was considered preferable to use the differences in mean values before and after treatment for the calculations. The copper injected significantly increased cupremia levels in the animals treated (by 29 $\mu$ g/100 ml) whereas the cupremia levels in controls decreased by 12 $\mu$ g/100ml ($t = 5.15$ for 18 D.L.; $P < 0.01$)(table 1) Ceruloplasmine also increased in treated animals (66.5 U of D.O.) whereas it decreased in the control animals (101 U. of D.O.) ($t = 3.88$ for 18 D.L. $P < 0.01$) (table 2) . The level of copper in the liver is significantly higher in treated ewes than in the controls ($t = 2.315$, $P < 0.05$)(table 3).

The cupremia level rises significantly the 6th day after the injection. It is still significantly higher than in controls on the 21st day. The evolution of ceruloplasmine closely follows that of the cupremia level. Ceruloplasmine (C.P.) is, moreover, closely correlated with plasmic copper (Cu), $r = 0.832$ for 380 pairs of data obtained during the entire experiment with the following rule Cu = 0.209 C.P. 38.38.

The bilirubinemia level of the ewes remained normal throughout the experiment (in the range of 0 to 0.4 mg/liter).

1b. The injection of zinc in the form of zinc oxide.

The animals were classified in order of increasing plasmic zinc, paired and treated as in example 1a. The treated ewes received 200 mg zinc oxide (Prolabo) (average particle size : 1 $\mu$ ) in 4 ml olive oil treated with alcohol; the controls only received the excipient.

The results obtained are given in table 4.

Plasmic zinc increases significantly in the treated animals (17.2 $\mu$ g/100 ml) whereas it decreases by 7 $\mu$ g/100 ml in the controls ($t = 5.874$ for 16 DL, $P < 0.001$) (table 4). The significant increase of plasmic zinc in ewes which had received 1 injection appeared on the 3rd day and persisted until the 17th day. The values observed for the controls and treated ewes remained within normal limits throughout the experiment.

The results of examples 1 and 2 above show that release of the trace elements injected into the plasma is progressive. For copper, the maximum is only reached on the 6th day. Copper was effectively metabolized by the liver as the increase in ceruloplasmine is parallel to that of copper, and at the end of the experiment the hepatic copper had increased without, however, exceeding 1000 ppm on dry basis, a value considered as being characteristic of chronic poisoning by copper. The level of bilirubinemia always remained normal, which shows that the treatment is harmless from the point of view of the possibility of cupric poisoning, as this immediately results in a hemolytic jaundice, as the level of bilirubinemia is very high. Release of zinc was slower, as the maximum level in the plasma was only reached by about the 10th day.

The levels of plasmic copper and zinc in control animals decreased without reaching values characteristic of deficiency. This decrease without doubt indicates the low level of said elements in hay.

The injection is effective for a minimum of 21 days in the case of copper and 17 days for zinc. As copper is stored in the liver, this period is doubtless much longer, whereas as zinc is only stored to a very slight extent the time for which it remains active is probably limited to the release of zinc from the injection site. The duration is, however, sufficient to improve the condition of the animals before reexamining the composition of the ration.

Clinically speaking, the ewes treated always remained in a normal state with respect to both copper and zinc. No signs of pain were observed and the injection sites showed no modifications perceptible by palpation. This last act resulted in no defense reactions. After the ewes treated with copper were slaughtered (on the 21st day after treatment) the injection sites could not be found when the muscles were dissected.

The above trials demonstrate that intramuscular injection of pulverulent copper or zinc oxide in suspension in purified olive oil enabled the plasmic levels of the elements in question to be increased in the animals treated. The hepatic stock of copper was also increased.

The effect of the treatment according to the invention is rapid and lasts for at least three weeks.

TABLE I

Comparison of the plasmic copper of ewes before and after injection of copper ($\mu$ g/100 ml)

| Pair No. | Treated | | | | Controls | | |
|---|---|---|---|---|---|---|---|
| | ewe No. | before treatment | After treatment | Difference | ewe No. | before treatment | after treatment | Difference |
| 1 | 1 | 89.3 | 119.2 | 29.9 | 2 | 95.3 | 83.7 | −11.6 |
| 2 | 3 | 104.3 | 127.7 | 23.4 | 4 | 103.5 | 112.5 | 9 |
| 3 | 5 | 104.1 | 105.2 | 1.1 | 6 | 115.5 | 112.7 | − 2.8 |
| 4 | 7 | 116.3 | 181.7 | 65.4 | 8 | 118.5 | 105.5 | −13 |
| 5 | 9 | 132.5 | 182 | 49.5 | 10 | 120.6 | 105 | −15.6 |
| 6 | 11 | 135.1 | 173.2 | 38.1 | 12 | 135.5 | 123.2 | −12.3 |
| 7 | 13 | 135.6 | 149.3 | 13.7 | 14 | 142.1 | 150.7 | 8.6 |
| 8 | 15 | 142.5 | 144.4 | 1.5 | 16 | 149.5 | 136.5 | −13 |
| 9 | 17 | 148.3 | 182.5 | 34.2 | 18 | 161.3 | 126 | −35 |
| 10 | 19 | 169.9 | 205 | 35.1 | 20 | 168.2 | 130.2 | −38 |
| Average | | | | 29.2≠ | | | | −12.4≠ |

≠ Significant difference $P < 0.001$

TABLE 2

Comparison of the plasmic ceruloplasmine of ewes before and after injection of copper (Unit of D.O.)

| Pair No. | ewe No. | Treated before treatment | Treated after treatment | difference | Ewe No. | Controls before treatment | Controls after treatment | difference |
|---|---|---|---|---|---|---|---|---|
| 1 | 1 | 325 | 386 | 61 | 2 | 361 | 243 | −118 |
| 2 | 3 | 369 | 408 | 39 | 4 | 424 | 429 | 5 |
| 3 | 5 | 366 | 296 | −70 | 6 | 452 | 370 | −82 |
| 4 | 7 | 400 | 634 | 234 | 8 | 427 | 293 | −134 |
| 5 | 9 | 482 | 649 | 167 | 10 | 435 | 298 | −137 |
| 6 | 11 | 410 | 465 | 55 | 12 | 427 | 353 | −74 |
| 7 | 13 | 491 | 446 | −45 | 14 | 530 | 551 | 21 |
| 8 | 15 | 544 | 494 | −50 | 16 | 500 | 377 | −123 |
| 9 | 17 | 514 | 596 | 82 | 18 | 573 | 399 | −174 |
| 10 | 19 | 548 | 650 | 102 | 20 | 607 | 410 | −197 |
| Average | | | | 66.5≠ | | | | −101≠ |

≠ Significant difference P < 0.001

TABLE 2

Comparison of the plasmic ceruloplasmine of ewes before and after injection of copper (Unit of D.O.)

| Pair no. | ewe no. | Treated Hepatic copper | ewe no. | Controls Hepatic copper |
|---|---|---|---|---|
| 1 | 1 | 113 | 2 | 45 |
| 2 | 3 | 390 | 4 | 288 |
| 3 | 5 | 450 | 6 | 282 |
| 4 | 7 | 630 | 8 | 705 |
| 5 | 9 | 990 | 10 | 570 |
| 6 | 11 | 456 | 12 | 328 |
| 7 | 13 | 855 | 14 | 322 |
| 8 | 15 | 595 | 16 | 246 |
| 9 | 17 | 400 | 18 | 382 |
| 10 | 19 | 810 | 20 | 134 |
| Average | | 569≠ | | 331≠ |

≠ Significant difference (P < 0.05).

TABLE 4

Comparison of plasmic zinc in ewes before and after injection of zinc ($\mu$ g/100 ml)

| Pair No. | ewe No. | Treated before treatment | Treated after treatment | difference | ewe no. | Controls before treatment | Controls after treatment | difference |
|---|---|---|---|---|---|---|---|---|
| 1 | 1 | 63.3 | 92.3 | 29.0 | 2 | 58.6 | 64.6 | 6.0 |
| 2 | 3 | 65.1 | 75.1 | 10.0 | 4 | 65.5 | 65.3 | −0.2 |
| 3 | 5 | 67.2 | 86.1 | 18.9 | 6 | 67.5 | 63.2 | −4.3 |
| 4 | 7 | 68 | 87.6 | 19.6 | 8 | 69.2 | | |
| 5 | 9 | 71.2 | 89.3 | 18.1 | 10 | 69.4 | 64.3 | −5.1 |
| 6 | 11 | 74.2 | 83.8 | 9.6 | 12 | 72.5 | | |
| 7 | 13 | 76.7 | 102.0 | 25.3 | 14 | 75.8 | 77.3 | 1.5 |
| 8 | 15 | 78.3 | 99.8 | 21.5 | 16 | 79.1 | 66.0 | −13.1 |
| 9 | 17 | 80.8 | 90.5 | 9.7 | 18 | 83.7 | 68.8 | −14.9 |
| 10 | 19 | 86.0 | 96.0 | 10.0 | 20 | 98.3 | 72.5 | −25.8 |
| Average | | | | 17.2 ≠ | | | | −7.0 ≠ |

≠ Significant difference (P < 0.001)

EXAMPLE 2

Injection of Metal Zinc to Calves Suffering from Deficiency.

Two calves receiving milk deficient in zinc showed progressive lack of appetite, slowing down in growth and clinical signs indicating the probable onset of zinc deficiency.

Both animals received a dose of 300mg zinc (powdered metal) in solution in 5 ml olive oil purified by washing with 95° ethyl alcohol.

Growth response was immediate and marked (table 5). After slaughtering, 26 days after the injection, there was still a high level of plasmic zinc (130 and 142 $\mu$ g/100 ml), indicating continuing release of zinc from the injection site. It was possible to observe a dotted grey metal zinc area at the injection sites. The injection site showed no serious inflammation likely to develop unfavourably.

So, as is the case with zinc oxide (see example 1b), metal zinc may be used to effectively treat a deficiency of said element. The metal has the advantage of being released more slowly than the oxide and to induce in bovines inflammatory reactions which are mild enough not to harm the animal in any way.

TABLE 5

Growth of calves having received a deep intramuscular injection of 300 mg zinc.

| Interval in days | Calf no. 1 Weight (kg) | Calf no. 1 Gain (kg) | Calf no. 1 Gain g/day | Calf no. 2 Weight (kg) | Calf no. 2 gain (kg) | Calf no. 2 gain, g/day |
|---|---|---|---|---|---|---|
| | 120 | | | 78 | | |
| 9 | | 6 | 666 | | 9 | 1000 |
| | 126 | | | 87 | | |
| 7 | | 6 | 850 | | 8 | 1140 |
| | 132 | | | 95 | | |

TABLE 5-continued

Growth of calves having received a deep intramuscular injection of 300 mg zinc.

| Interval in days | Calf no. 1 Weight (kg) | Gain (kg) | Gain g/day | Weight (kg) | Calf no. 2 gain (kg) | gain, g/day |
|---|---|---|---|---|---|---|
| 7 (date of injection) | 136.5 | 4.5 | 643 | 96 | 1 | 142 |
| 7 | 147 | 10.5 | 1500 | 104 | 8 | 1140 |
| 7 | 160.5 | 13.5 | 1930 | 112.5 | 8.5 | 1214 |
| 12 | 174 | 13.5 | 1125 | 125 | 12.5 | 1042 |
| Mean growth before the injection | | 720 g/day | | | | 760 g/day |
| Mean growth after the injection | | 1518 g/day | | | | 1132 g/day |
| Plasmic zinc at slaughtering | | 130 µg/100 ml | | | | 142 µg/100 ml |

EXAMPLE 3

Results Obtained in Ruminants with Injections of Manganese

3a. Injection of manganese in the form of manganese dioxide ($MnO_2$).

The injection of 200 mg manganese dioxide in suspension in 4 ml purified olive oil to 30 kg lambs by the intramuscular method into the neck was very well supported by the animals.

After slaughter 15 days later the oxide was found at the injection site in the form of a dotted area more or less disseminated in the muscle over a distance of 5 to 6 centimeters. Inflammation was moderate and did not appear to be likely to develop unfavorably.

An injection of 600 mg manganese dioxide to a Jersey cow and 300 mg to a Fresian calf in, respectively, 10 and 5 ml purified olive oil induced visible inflammation too severe for this type of manganese compound to be used for bovines.

3b. Injection of manganese in the form of metal manganese.

Two calves about 1 month old received a dose of 200 mg manganese (metal in 5 ml purified olive oil.

Visible, severe inflammation appeared on the day after the injection and disappeared on the 4th or 5th day. Inflammation was accompanied by a slight loss of appetite.

Metal manganese is therefore not the form the most adapted to bovines: the inflammation is too severe.

3c. Injection of manganese in the form of manganese sesquioxide ($Mn_3O_4$).

Two six week old calves received and intramuscular injection in the neck of 5 ml of a suspension in purified olive oil of 275 mg $Mn_3O_4$, representing 200 mg manganese.

No unfavorable inflammation had appeared by the 4th day. The animals showed no defence reaction when the injection site was palpated, and did not loose appetite.

The results obtained with manganese sesquioxide are therefore very satisfactory with bovines and ovines. Amounts of 30 to 100 mg of $Mn_3O_4$ per ml can be used.

EXAMPLE 4

Propylaxis of Copper Defiency in Sheep Put Out to Grass by the Injection of Copper Oxide As the efficacy of injections of insoluble, non ionizable forms of copper which are released slowly by moderate inflammation has already been demonstrated above, it was interesting to test the duration of the delay effect obtained with copper oxide, a form which was found preferable to metal copper for bovines. Copper oxide is less caustic than the metal and the inflammation obtained in bovines with this form is difficult to detect, even with palping.

In another connection, certain prior studies have shown that the copper in young grass was less digestible than that found in hay. It was therefore considered to be of interest to confirm these results by investigating the level of cupremia in ewes put out to grass in the spring, which had received either one injection of copper, or no injection, and to observe the duration of the efficacy of said injection.

With this aim in view, 21 ewes having a mean weight of 46 kg were used which had received mediocre hay the previous winter without concentrated feed or additional minerals.

The animals were pastured on a temporary meadow of Italian ray grass. This same ray grass in an experimental plot adjacent to the meadow had a level in the range of 4.4 to 5 mg/kg DM during the experiment.

A blood sample was taken from all the animals the day they were put to pasture and 11 of the ewes received an intramuscular injection in the neck of 60mg copper in the form of copper oxide in suspension in 5ml olive oil purified by washing in 95° ethyl alcohol.

Samples of heparinezed blood were then taken every week from both treated and control animals.

Copper in the plasma was determined by atomic absorption spectrometry after deproteinization with trichloracetic acid. Ceruloplasme was determined by the SUNDERMAN and NOMOTO (1970) method. The results of ceruloplasmic activity are expressed in D.O. units.

When the cupremia levels of the treated lot compared with the control lot were not significantly different the animals were slaughtered and a liver sample (speegal lobule) was taken and analysed for copper.

RESULTS

Between putting out to grass and the end of the experiment, the values obtained for copper and plasmic ceruloplasmines decreased significantly in the control ewes (table 6).

TABLE 6

Copper and plasmic ceruloplasmine in treated and control lots (results expressed) respectively in µg/100 ml and units of D.O.

| Dates | Treated animals | | Control animals | |
|---|---|---|---|---|
| | Copper | Ceruloplasmine | Copper | Ceruloplasmine |
| 4/5 | 117.6 ± 36[1] | 473 ± 134 | 120.8 ± 23.8 | 463 ± 90.2 |
| 10/5 | 141.4 ± 29.7 | 602.2 ± 162.7 | 119 ± 22.3 | 492 ± 112.5 |
| 17/5 | 194.7 ± 83.5[2] | 719.3 ± 165 [3] | 121.4 ± 19.8 | 478.7 ± 99 |
| 24/5 | 142 ± 15 [3] | 519 ± 66 [3] | 107.6 ± 20.6 | 411.5 ± 87 |
| 1/6 | 154 ± 40 [2] | 492 ± 112 [2] | 112.6 ± 23.7 | 380 ± 86 |
| 7/6 | 141 ± 33 [2] | 506 ± 148 [2] | 160 ± 23 | 385 ± 108 |
| 14/6 | 132 ± 23.8 [3] | 616 ± 137 [3] | 97.1 ± 26.2 | 417 ± 134 |
| 21/6 | 124.7 ± 22.13 [3] | 378 ± 94 | 91.3 ± 28.8 | 286 ± 115 |
| 28/6 | 117.1 ± 15.7 [2] | 343 ± 107.5 | 87.2 ± 39.3 | 293.1 ± 124.1 |
| 5/7 | 116.1 ± 21.1 | 557.6 ± 135.3 | 87.6 ± 39.4 | 452.5 ± 212.1 |
| 11/7 | 113.6 ± 35.7 | 398 ± 204.9 | 86.2 ± 38.6 | 280.9 ± 172 |

[1] mean ± standard deviation ($\bar{x} \pm \sigma$)
[2] Significant difference between treated animals and controls ($P < 0.05$)
[3] Highly significant difference between treated animals and controls ($P < 0.01$).

From the 13th day to the 54th day the cupremia of the ewes which had received an intramuscular injection of copper oxide have a higher level of copper in the blood than controls. This difference was only significant from the 13th to the 47th day for ceruloplasmine.

Release of the copper injected starts on the 6th day and reaches a maximum on the 13th day. This release then continues slowly.

After slaughter, on the 67th day of the experiment, the ewes which had received the injection had a mean hepatic copper level of 190 µ g/g DM (extremes 80 to 1060), significantly higher than was observed in controls (average 55 µ g/g DM and extremes 13–376) ($P < 0.025$).

The choice of cast ewes, which had been badly fed in winter, was dictated by the necessity of having animals whose level of hepatic copper was not too high to start with. The progressive fall in the cupremia level in controls indicates that this condition was fulfilled although none of the control animals had a level of cupremia at the start lower than 81 µ g/100 ml. The limit of deficiency is about 70 µ gCu/100ml, therefore none of the ewes suffered from deficiency at the start of the experiment.

The cupremia levels and plasmic ceruloplasmines of the control lot decreased regularly during the experiment: at slaughtering three of these animals had cupremia levels of 40 to 42 µ g cu/100ml and hepatic levels of 13.2 to 14.4 µg Cu/g DM, which indicates severe deficiency. The limit of deficiency for hepatic copper being about 70 µ gCu/g DM.

Deficiency was triggered by the low copper content of ray grass (4.4 mg/kg DM). Young grasses are normally richer in copper (7 mg/kg DM). Furthermore, the poor digestibility of the copper in this grass doubtlessly aggravated the deficiency.

The treated animals, on the other hand, did not show deficiency symptoms, but on the 67th day still had stocks of hepatic copper higher than the controls and higher than the limits of deficiency.

It can therefore be seen that the injection is efficace for longer than two and a half months for protecting animals receiving food bringing about severe deficiency. In routine prophylaxis, that is to say with animals having a normal level of copper when put to grass, the efficacy of the injection can lost for 4 to 5 months because the levels of hepatic copper of the animals treated are still relatively high on the 67th day after the injection.

The dose injected (60 mg Cu/ewe) is a maximum dose which should not be exceeded. The hepatic level of 1060 µg Cu/g DM of one of the ewes treated is at the limit usually admitted for the toxicity of this element. However, no hemolytic jamdice (characteristic of copper poisoning) was observed in any of the ewes treated. A dose of 40 to 50 mg Cu constitutes the optimal dose. Similarly, no serious inflammation was observed at the injection sites.

To conclude, the trial described in example 4 shows that, when at pasture, under conditions of feeding which initiated copper deficiency in controls, a single intramuscular injection of 60 mg copper in the form of copper oxide effectively protected animals from deficiency disease. The treatment remains efficace for longer than two and a half months. Under normal conditions (less severe) the treatment is efficace for 4 to 5 months. The dose of 60 mg copper per ewe is a maximum not to be exceeded.

EXAMPLE 5

Duration of the Delay Effect Obtained with an Injection of Metal Zinc to Ewes.

It has been demonstrated above that intramuscular injections of zinc oxide to ewes are efficace to increase plasmic zinc levels. However, metal zinc (in powder) is a preferable form for bovines. This form makes it possible to obtain moderate inflammation. It is effective to treat zinc deficiency rapidly. In the following trials the duration of efficacy was determined to evaluate the extent of the delay effect obtained with injections of metal zinc.

Metal zinc having a particle size of 325 mesh normally used (Alfa inorganics, ref. 424) was irradiated and rendered radioactive. A 900 mg sample was irradiated for 3 days in a neutron flux of $3.10^{12}/cm^2/s$. The sample had a radioactivity of 1 mei.

Three ewes each received 300 mg of zinc (0.33 mci) in 5 ml purified olive oil by intramuscular injection in the neck.

Countings were effected on the radioactivity of the neck, compared with the radioactivity of the thigh. They were effected in the animals maintenance stall.

The scintillation detector was placed 35 cm from the skin. The probe was placed at the place where counting was effected to measure the background noise of the radioactivity emitted by the animals in their stall.

RESULTS

Table 7 shows radioactivity levels of the neck, the thigh and the ratio of these two radioactivity levels for each of the three ewes.

This ratio decreases with time, but the radioactivity levels at the injection sites are still significantly higher at the counting date.

Radioactivity levels were measured 35 cm from the skin to limit the influence of the distance on the radioactivity levels measured. It is known that counting effected immediatly adjacent the source is greatly disturbed by the slightest change in distance. At the distance adopted, the influence of such a modification is reduced.

Radioactivity of the thigh, measured the first day just after the injection, represents a parasite radioactivity emanating from the injection site. Radioactivity of the thigh rises progressively with release of the injected zinc. The thigh was selected as being the area the furthest from the injection site. It consists of a mass of muscle and bone as similar as possible to the neck and relatively distant from the viscera.

The ratios of radioactivity were preferred. Results were observed to be heterogenous on the one hand from one ewe to another, and on the other hand from one counting to another. Countings effected on the same day are realized at short intervals and are therefore comparable, whereas the absolute values obtained from one day to the next are less comparable.

So long as the ratio of the two levels of radioactivity is higher than 1 it can be concluded that the zinc injected is still present at the injection site, which is the case at the date of counting.

Table 7 shows that the delay effect of the metal zinc administered to ewes by intramuscular injection lasts considerably longer than two and a half months.

The ratio between radioactivity at the injection site and in the thigh is still from 2.3 to 3.2 after this lapse of time.

The invention is applicable to the treatment of all animals likely to suffer from trace element deficiency. It is particularly advantageous for the treatment of ovins, young bovines and bovines.

ing, by intramuscular or subcutaneous route, to such animals having such deficiency an effective amount of a composition in the form of a suspension containing said trace-metals in a viscous and apyrogenous excipient, the suspended trace-metal being present as the free metal or an oxide thereof, being non-soluble in aqueous media, non-ionizable and capable of slow release after intramuscular or subcutaneous injection.

2. The method of claim 1, wherein said excipient is a purified vegetable oil selected from the group consisting of olive oil, peanut oil, corn oil and sunflower oil.

3. The method of claim 1, wherein said excipient is purified almond oil.

4. The method of claim 1, wherein the suspended trace-metal compound is selected from the group consisting of copper, zinc and manganese in the form of fine powders of free metals.

5. The method of claim 1, wherein the suspended trace-element compound is selected from the group consisting of CuO, ZnO, $MnO_2$ and $Mn_3O_4$.

6. The method of claim 1, wherein the trace-metal compound is present as a powder having an average particle size of about 1 to $3\mu$.

7. The method of claim 4, wherein the trace-metal is copper in a concentration in the suspension between about 10 mg and 15 mg/ml of excipient, the injected dosage being from 5 to 10 ml according the animal being treated and the weight thereof.

8. The method of claim 4, wherein the trace-metal is zinc in a concentration in the suspension between about 40 and 100 mg/ml of excipient, the injected dosage being from 5 to 10 ml according the animal being treated and the weight thereof.

9. The method of claim 5, wherein the trace-metal compound is CuO in a concentration in the suspension between about 10 and 20 mg/ml of excipient, the injected dosage being from 5 to 10 ml according the animal being treated and the weight thereof.

10. The method of claim 5, wherein the trace-metal compound is ZnO in a concentration in the suspension between about 45 and 120 mg/ml of excipient, the injected dosage being from 5 to 10 ml according the animal being treated and the weight thereof.

11. The method of claim 5, wherein the trace-metal compound is $Mn_3O_4$ in a concentration in the suspension between about 30 and 100 mg/ml of excipient, the

TABLE 7

| | Comparative radioactivity of the injection site and the body in the case of three ewes injected with $65_{Zn}$ | | | | | | | | |
|---|---|---|---|---|---|---|---|---|---|
| Ewe no. | Dates | 14–6 | 25–6 | 4–7 | 13–7 | 23–7 | 3–8 | 13–8 | 23–8 | 3–9 |
| 2617 | neck | 4621 | 5180 | 5038 | 4602 | 4000 | 4947 | 3731 | 3553 | 3909 |
| | thigh | 695 | 1027 | 1153 | 1160 | 1197 | 1521 | 1084 | 1056 | 1408 |
| | Ratio of radioactivities | 7.3 | 5.5 | 4.7 | 4.3 | 3.6 | 3.4 | 3.7 | 3.7 | 3.0 |
| 2669 | neck | 2411 | 2734 | 2047 | 2140 | 2209 | 2173 | 1596 | 1667 | 1922 |
| | thigh | 433 | 578 | 639 | 704 | 866 | 856 | 649 | 672 | 919 |
| | Ratio of radioactivities | 6.5 | 5.5 | 3.7 | 3.4 | 2.8 | 2.7 | 2.7 | 2.8 | 2.3 |
| 2640 | neck | 3396 | 4611 | 3864 | 4451 | 4649 | 4614 | 3498 | 3967 | 4542 |
| | thigh | 744 | 1111 | 1159 | 1136 | 1415 | 1367 | 1121 | 1393 | 1523 |
| | Ratio of radioactivities | 5.9 | 4.5 | 3.6 | 4.2 | 3.5 | 3.5 | 3.3 | 3.0 | 3.2 |
| Background noise | | 73 | 104 | 121 | 105 | 123 | 93 | 104 | 134 | 155 |

What we claim is:

1. A method for controlling trace-metal deficiency in bovine and ovine animals, comprising the step of injectinjected dosage being from 5 to 10 ml according the animal being treated and the weight thereof.

* * * * *